April 24, 1956

H. D. EPSTEIN 2,743,333

THERMOSTATIC SWITCH

Filed Sept. 10, 1954

4 Sheets-Sheet 1

Inventor,
Henry David Epstein,
by Townsend M. Gunn,
Att'y.

Inventor,
Henry David Epstein,
by Townsend M Gunn
Att'y.

April 24, 1956 H. D. EPSTEIN 2,743,333

THERMOSTATIC SWITCH

Filed Sept. 10, 1954 4 Sheets-Sheet 3

Inventor,
Henry David Epstein,
by Townsend M. Gunn
Atty.

Inventor,
Henry David Epstein,
by Townsend M. Gunn
Atty.

United States Patent Office 2,743,333

Patented Apr. 24, 1956

2,743,333

THERMOSTATIC SWITCH

Henry David Epstein, Boston, Mass., assignor to Metals & Controls Corporation, Attleboro, Mass., a corporation of Massachusetts Application September 10, 1954, Serial No. 455,123

12 Claims. (Cl. 200—138)

This invention relates to snap-acting thermostatic switches, and in particular to snap-acting thermostatic switches of the manually resettable indicating type. It also has specific reference to the type of thermostatic switch which opens and closes automatically for a predetermined number of cycles, and then stays open thereafter for manual resetting.

Among the several objects of the invention may be noted the provision of a snap-acting thermostatic switch of the indicating kind which stays in open circuit condition once the contacts have opened, and requires manual resetting to close the contacts; the provision of a thermostat of the said class which has improved means for preventing reclosing of the contacts after the first opening operation of the thermostat, which means also incorporates indicating means; the provision of a snap-acting thermostat of the class described in which improved means are provided for mechanically holding the contacts of the switch apart after the first opening operation of the switch contacts, said mechanical means being displaceable by manual actuation to permit the closing of the contacts of the switch; the provision of a snap-acting thermostatic switch of the manually resettable type, but in which the switch will first cycle on and off a predetermined number of times and then arrive at an open circuit position which requires manual actuation to close the contacts again; the provision of switches of the last named class which may be made easily in a straight-line indicating type, or a rotary-action indicating type; and the provision of switches of the above classes which are economical to make and foolproof in operation. Other objects and advantages will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Similar reference characters indicate corresponding parts throughout the several views of the drawings.

It is the general purpose of this invention to supply a simple, snap-acting thermostatic switch of the indicating and manually resetting kind, that is, the type of thermostatic switch which requires manual resetting in order to close the switch contacts after the switch contacts have opened. It is proposed in this invention to use, as the manually resetting element, a slide mechanism which is interposed between the snap-acting thermostatic element of the switch and the base in order to keep at least one of the switch contacts separated from its mating contact until the interposed means is manually removed.

Figures 1, 2, 3, 4, 5, 6, 7, 8:
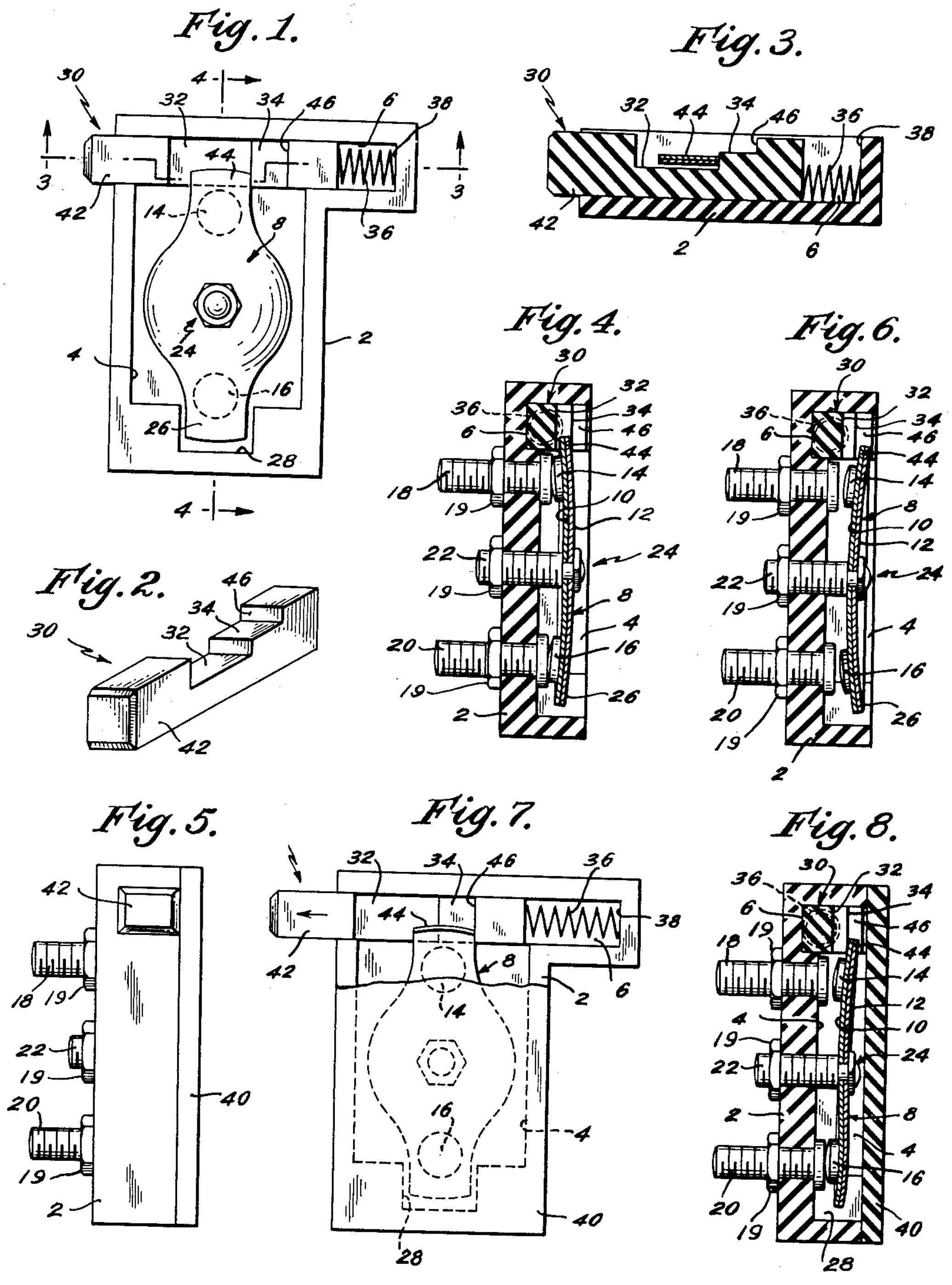
Fig. 1 is a top view of one embodiment of the invention with the cover thereof removed.
Fig. 2 is an isometric projection of a component part of the Fig. 1 embodiment.
Fig. 3 is a cross section of the Fig. 1 embodiment taken in the direction of sight lines 3—3 thereon.
Fig. 4 is a cross section of the Fig. 1 embodiment taken in the direction of sight lines 4—4 thereon.
Fig. 5 is a lefthand view of the Fig. 1 embodiment but with a cover thereon.
Fig. 6 is a cross section of the Fig. 1 embodiment, similar to Fig. 4, but showing the thermostatic switch means thereof in an intermediate position.
Fig. 7 is a top view of the Fig. 1 embodiment, the cover being broken away in part to show the working parts of the device in another position with one of the switch contacts open.
Fig. 8 is a cross section of the Fig. 1 embodiment, taken in the same direction as Fig. 4, and showing one of the contacts being held in an open position.

Referring now to the drawings, in Fig. 1 there is shown one embodiment of this invention, comprising a base 2 made of electrically insulating material such as Bakelite, or some other molded plastic. Base 2 is provided with the recess 4 therein, and a cross recess or groove 6 at the upper end of the base. Recess 4 houses the snap-acting thermostatic element of the device and the electrical contacts, and recess or groove 6 houses the slide mechanism which is used to hold the contacts apart after they have opened.

The thermostatic element in the particular embodiment shown is the snap-acting thermostatic element 8 which is more fully described and claimed in United States Patent 2,317,831. Since the operation of this element is fully explained in said patent, only a brief explanation will be given here, as follows:

The element is made of thermostat metal, and has the central portion thereof dished. The high expansion side 10 of the metal is on the concave side of the element, and the low expansion side 12 is on the convex side of the element, when the element is at its normal or room temperature with the contacts of the switch closed. A device such as this, when heated to some predetermined or "set" temperature will snap to a position of opposite concavity such as is shown in Fig. 6. On cooling, it will snap back to the shape shown in Fig. 4.

It is also to be noted that other kinds of snap-acting elements may be used in place of the one shown herein. For example, devices of the types shown in United States Patents Nos. 2,299,562, 2,533,274, 2,567,361, 2,587,789 and 2,656,592 may also be used with ease.

Welded to and carried by snap-acting element 8 are the movable contacts 14 and 16. Contacts 14 and 16 engage respectively the stationary or base contacts 18 and 20. The snap-acting element 8 is held in position on the base by means of the adjustable mounting screw 22 which engages the snap-acting element by means of properly provided shoulders and washers as indicated generally by numeral 24. The element is prevented from rotating (and therefore misaligning the respective contacts) by reason of one end 26 of the element loosely engaging a narrowed recessed portion 28 in base 2. Lock nuts 19 are provided on the terminals 18 and 20, and on adjusting post 22, as shown.

Slidable in the groove 6 is the manual actuator, indicated generally by numeral 30, which may be made of electrically insulating material such as Bakelite or other moldable plastic. Actuator 30 is generally rectangular in cross section, and is provided with the recess 32 and step 34 as shown in Figs. 2 and 3. A compression spring 36 is inserted between the right-hand end of actuator 30 and the end 38 of the groove 6, and urges actuator 30 to the left, as drawn. A cover 40 (shown in Fig. 5) is provided to overlie all of the base 2 and thus retain the actuator 30 in place. It will be noted that the left-hand end 42 of actuator 30 projects beyond the base so as to be engageable manually. It will also be noticed that the end 44 of thermostat element 8 extends into groove 6, and in so doing overlies actuator 30. It will also be noticed that when the element 8 is in its normal or cold position (that is, the position in which contact 14 engages stationary contact 18), the end 44 lies below the level of step 34, that is, lies in recess 32. A slight clearance is provided between the end 44 and the bottom of recess 32 to allow positive engagement of contacts 14 and 18. In this position, spring 36 urges actuator 30 to the left, and the edge of step 34 lightly abuts the side of end 44.

The device operates as follows: When the device is heated, as by the passage of electrical current through the snap-acting element 8 or by the heating thereof by ambient temperature changes, the snap-acting element will heat to its snapping point and snap to a position of opposite concavity as shown in Fig. 6. In this position it will be observed that the end 44 of element 8 has snapped above the level of step 34, and thus releases actuator 30 so that it is pushed to the left until the right-hand face 46 of step 34 abuts end 44, thus preventing further sliding to the left of actuator 30. This position is shown in Fig. 7, and it will be observed that end 42 has extended out from base 2 further to the left, thus giving an indication that the contacts are now separated. When snap-acting element 8 cools to its snap-back temperature, the one end 26 of the element, being unrestrained, snaps back until the contact 16 again engages stationary contact 20. However, end 44, in snapping back, comes to rest on step 34, and this effectively separates contact 14 from stationary contact 18. This is shown in Fig. 8. The device remains in this contact-open position until end 42 of actuator 30 is pushed to the right to move the step 34 from beneath the end 44, so that the latter can snap down into recess 32, thus allowing contact 14 to engage contact 18 again.

Figure 10:
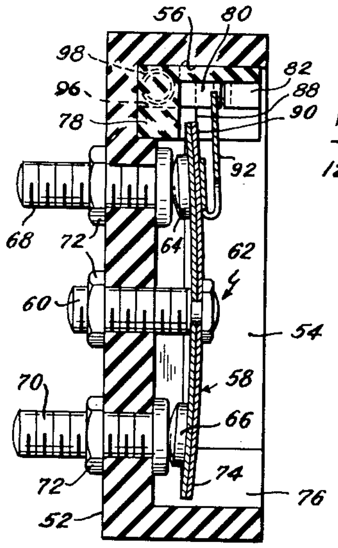
Fig. 10 is a cross section of the Fig. 9 embodiment, taken in the direction of sight lines 10—10 thereon.
Figure 9:
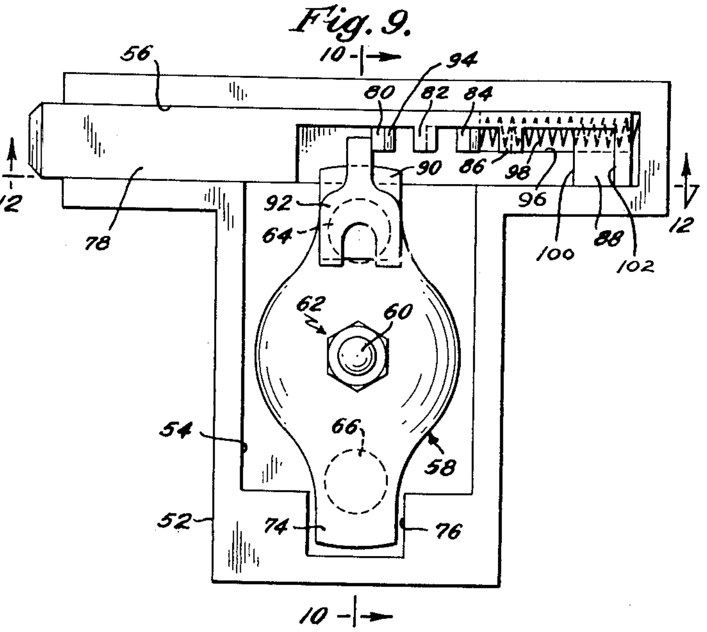
Fig. 9 is a top view of another embodiment of this invention with its cover removed.
Figure 11:
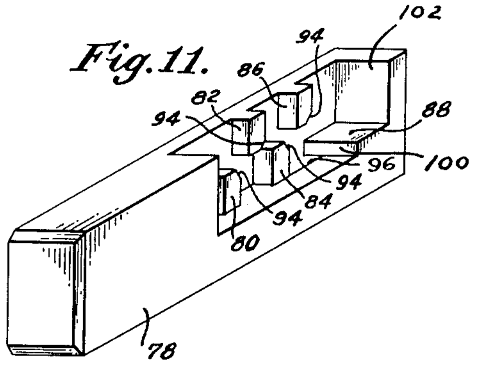
Fig. 11 is an isometric projection of one of the component parts of the Fig. 9 embodiment.

As has been mentioned in the preamble of this specification, there is desired, sometimes, a device in which automatic operation of the switch will occur for a predetermined number of cycles, and then the device will go to a contact-open position which requires manual resetting to close the contacts. Reference to Figs. 9–11 will show constructional details of such a device.

Again, as in the above embodiment, the general structure provided is that of a snap-acting thermostatic element, the end of which is engageable by a slide mechanism which serves to hold the contacts apart at the correct moment. Resetting of the contacts is obtained by manual actuation of this slide. A base 52 is provided having the main body recess 54 and the end recess 56. The snap-acting thermostat element 58 is provided in the body recess 54, and again is supported in position by means of the central adjusting post 60 which engages the snap-acting element by the proper shoulders and washers, as indicated generally by numeral 62. Snap-acting element 58 is similar to element 8, and carries the movable contacts 64 and 66 which engage, respectively, the stationary contacts 68 and 70. The stationary contacts 68 and 70 as well as the adjusting post 60 are held firmly mounted in the base by means of the lock nuts 72. Again, element 58 is prevented from rotating by means of the engagement of end 74 in the narrowed recess 76.

The slide 78 in this instance is made in ratchet form, that is, it is provided with a succession of stops 80, 82, 84 and 86, as well as the step 88. (See Fig. 11.) Stops 80—86 extend toward the snap-acting element to only one-half the width of the slide 78, and thus clear the end 90 of element 58. Step 88, however, extends the full width of slide 78.

The upper end 90 of snap-acting element 58 extends into the upper recess 56, and thus overlies a portion of slide 78, but does not extend so far as to touch the stops 80—86. However, end 90 does extend far enough into recess 56 to engage step 88. End 90 carries, fastened thereto as by welding, a spring element or tongue 92 which extends into recess 56 far enough to engage stops 80—86 as shown in Fig. 9. At this point, it is to be noticed that stops 80—86 have one corner of each, as indicated by numeral 94 in Fig. 9, in each case chamfered (for a reason which will be explained below), and the space between slots thus provided is wide enough to receive the tongue 92.

Figure 12:
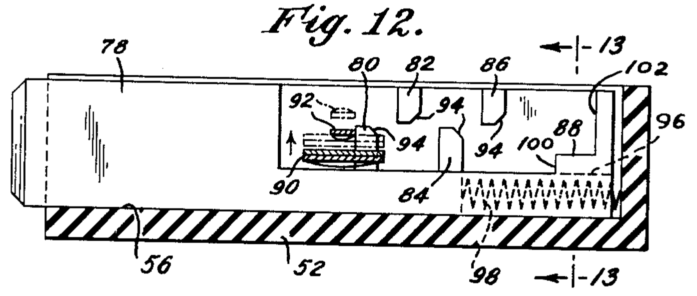
Fig. 12 is a cross section of the Fig. 9 embodiment, taken in the direction of sight lines 12—12 thereon.
Figure 13:
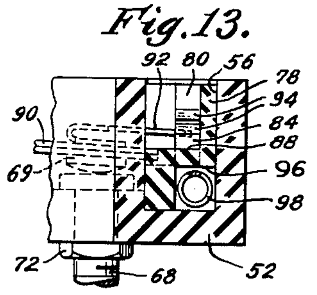
Fig. 13 is a cross section of a portion of the Fig. 9 embodiment taken in the direction of sight lines 13—13 on Fig. 12.

As indicated in Fig. 13, a portion of one corner 96 of slide 78 is rabbeted out to receive the compression spring 98 which urges slide 78 to the left, as drawn, the slide being stopped by the engagement of tongue 92 against the side of stop 80, as shown in Figs. 9 and 12. Of course, other forms of spring means can be substituted if desired. A cover, not shown, is provided for this Fig. 9 embodiment in the same manner as is provided in the Fig. 1 embodiment, to hold the parts in place.

Figure 14:
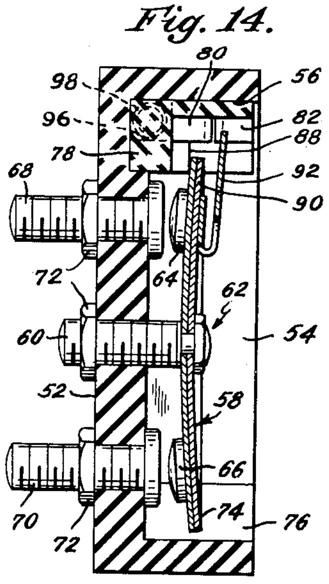
Fig. 14 is a cross section, similar to Fig. 10, but showing the thermostat element of the Fig. 9 embodiment in an intermediate position.
Figure 15:
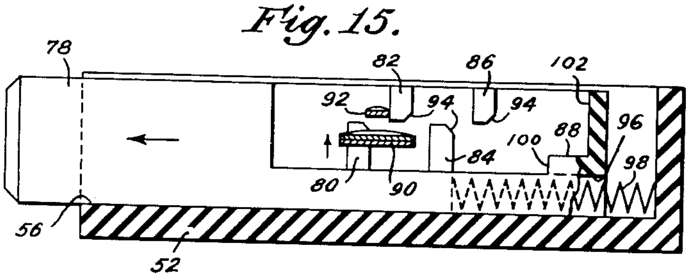
Figs. 15–19 are cross sectional views similar to Fig. 12, but showing successive operational positions of the working parts of the Fig. 9 embodiment.
Figure 16:
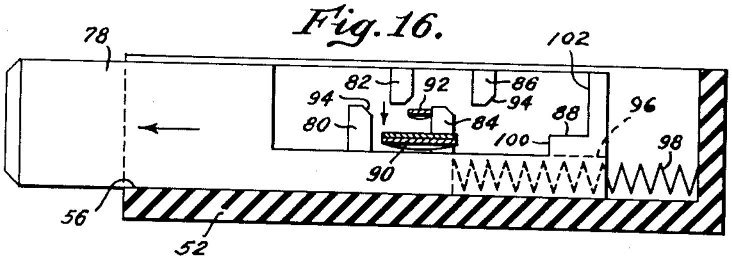
Figure 17:
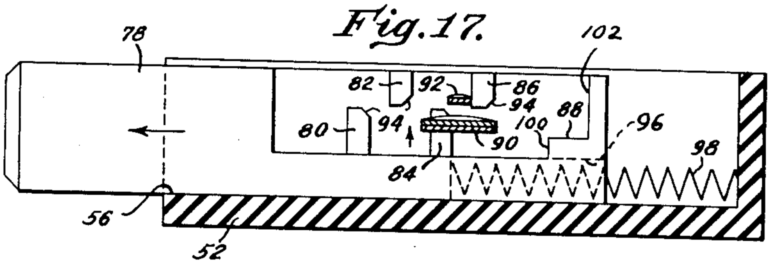
Figure 18:
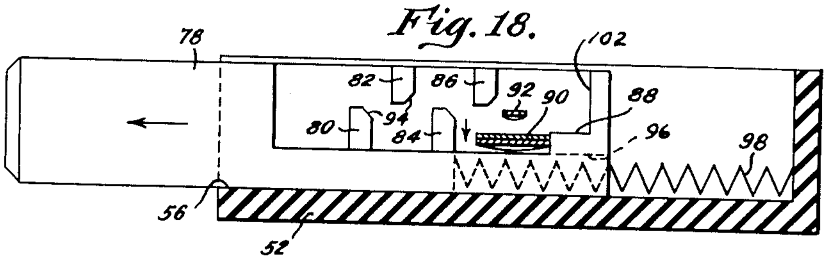
Figure 19:
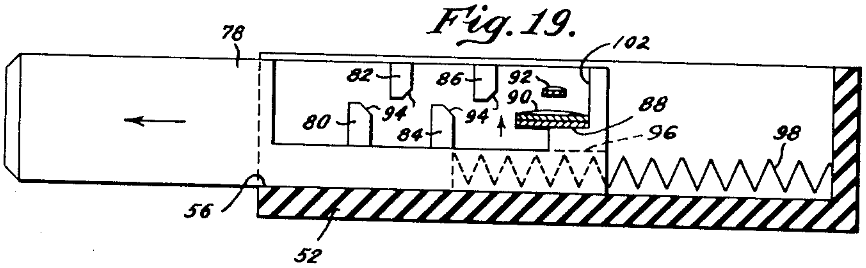

Operation of the device is as follows: Upon heating the device to a snapping temperature, it snaps to a position of opposite concavity (as shown in Fig. 14) to open the contacts. In this position, tongue 92 is moved upwardly (as shown by dotted lines in Fig. 12). This frees the slide 78 which moves to the left under the urging of spring 98, until the engagement of tongue 92 by stop 82 prevents further movement. This position is shown in Fig. 15 and is maintained until the thermostatic element cools to its snap-back temperature, at which time it snaps back to the position of concavity shown in Fig. 10. In so snapping, tongue 92 is snapped down (by the end 90 of the thermostat element) between stop 80 and stop 82. Spring 98 again urges the slide 78 further to the left until such leftward motion is stopped by the engagement of stop 84 by tongue 92, as shown in Fig. 16. If the thermostatic element is again heated, again it will snap to the concavity shown in Fig. 14, and tongue 92 will pass between the stops 84 and 86 to the position shown in Fig. 17, at which position spring 98 has urged slide 78 far enough to the left so that stop 86 engages tongue 92. Once more, the element 58 will cool and snap downward, and this time the left-hand edge 100 of stop 88 engages the right-hand edge of end 90 to stop further leftward motion of slide 78. (See Fig. 18) Again, if element 58 is heated to snap to the Fig. 14 position, this clears the slide 78 once more, and spring 98 pushes it to the left until the end 102 of slide 78 engages end 90 of the thermostatic element. This stops further motion to the left of slide 78. Now, when the element 58 cools to the snap-back temperature, it will snap back, but end 90 will come to rest on step 88 (as shown in Fig. 19) with the result that contact 64 is held separated from stationary contact 68. This is the final open position of the contacts. In order to close these contacts again, it is necessary to push on slide 78. Such manual actuation of slide 78 will push it to the right against spring 98, and in so doing the tongue 92 is pushed by means of chamfered surfaces 94 first slightly downward to pass underneath stop 86, then slightly upward to pass over stop 84, slightly downward to pass under stop 82, and finally slightly upward to pass over stop 80 to the Fig. 9 starting postion. At this point, of course, tongue 92 is released to permit engagement of contacts 64 and 68.

Figure 20:
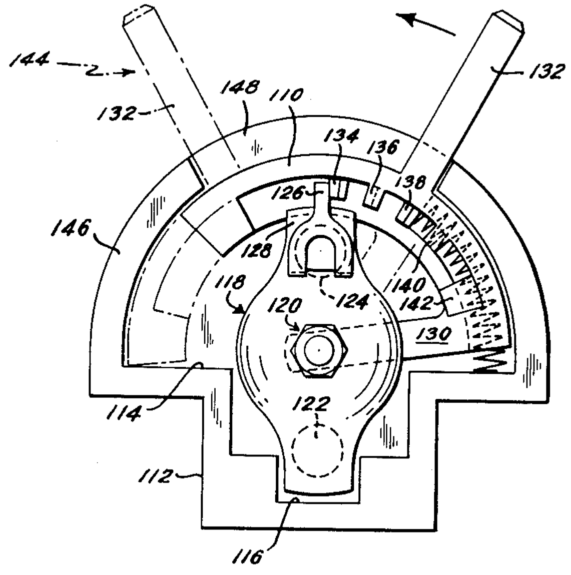
Fig. 20 is a top view of another embodiment of this invention, in which the manually actuatable means is made rotary instead of longitudinally slidable on a straight line, shown with the cover removed, and showing in dotted lines the contact-open position of the operating handle.

Referring now to Fig. 20, there is shown another embodiment of this invention, which differs from the Figs. 9–19 embodiment in the provision of a rotary ratchet for slide ratchet 78 of the Fig. 9 embodiment. Again, a base 112 is provided having the recesses 114 and 116. The snap-acting element 118 is provided of the type previously shown and described (or of the other types mentioned) mounted on adjusting post 120 (which is adjustably screwed into the base) and carrying movable contacts 122 and 124 as in the previous embodiments. These latter engage stationary base contacts (not shown) exactly as in the Fig. 9 embodiment. The tongue 126 is provided on end 128 of the snap-acting thermostat element, as before. The rotary ratchet 110 is in the form of an arcuate member as shown, having the inwardly extending mounting arm 130 which rotates on the adjusting post 120. A switch handle 132 is fastened to ratchet 110 as a means for rotating the ratchet. The ratchet is provided, exactly as in the Fig. 9 embodiment, with the fixed stops 134, 136, 138 and 140, and with the step 142, just as in the Fig. 9 embodiment. The stops 134—140 extend inwardly, as shown, for approximately one-half the depth (or width) of the ratchet, and are engageable by the tongue 126. End 128 of the snap-acting element 118 extends inwardly to overlap the ratchet member 110, and thus to be able to finally rest on the step 142, exactly as described for the Fig. 9 embodiment. The operation of the device is as described for the Fig. 9 embodiment. For each successive opening and closing of the contacts (that is, for each snapping to one position and back to the other position of the snap-acting element 118), the ratchet member 110 progresses one step further counterclockwise, the final position being reached when the step 142 is reached. This is indicated generally by the dotted lines 144. To reset the contacts, switch arm 132 is rotated clockwise with the tongue 126 passing successively under and over the respective stops. A cover can be provided for this embodiment, as in the previous embodiments, and if this is to be done, then the rim 146 of the casing 112 is relieved as at 148 so as to provide a slot for the movement of the switch arm 132. The height of the rotary ratchet is made just slightly less than the depth of recess 114 so as to permit the ratchet to move freely.

Figure 21:
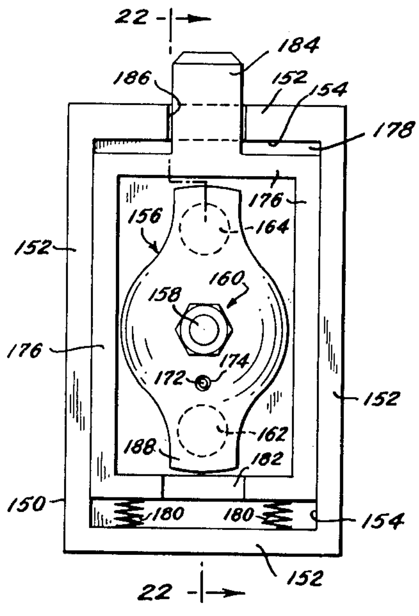
Fig. 21 is a top view of still another embodiment of this invention, with the cover removed.
Figure 22:
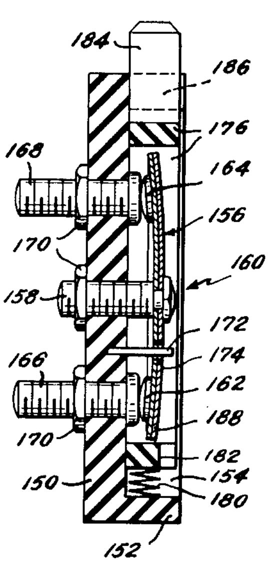
Figs. 22 and 23 are cross sections of the Fig. 21 embodiment taken in the direction of sight lines 22—22 thereon, showing different positions of the thermostat element therein.
Figure 23:
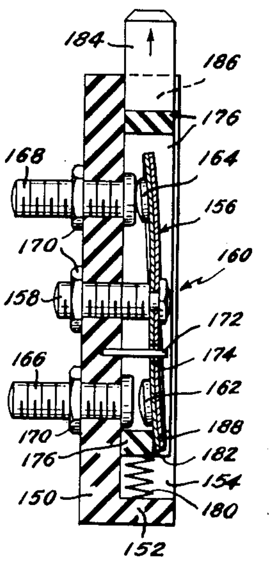

Referring now to Figs. 21–23, there is shown a third embodiment of the invention, and again a base 150 is provided of electrical insulating material such as Bakelite or other molded plastic. Base 150 has the upstanding surrounding edge or skirt 152 thus providing the interior recess 154. In recess 154 is mounted the snap-acting thermostat element 156 which is of the type described above. Element 156 is mounted, as before, on an adjusting post 158 (screwed into base 150) which engages the element by properly provided shoulders and washers indicated generally by numeral 160. Element 156 carries the movable contacts 162 and 164 which engage, respectively, the stationary contacts 166 and 168. The adjusting post 158 and stationary contacts 166 and 168 are locked securely in position on the base by lock nuts 170 in customary manner. To prevent rotation of snap-acting thermostat element 156, a guide post 172 is mounted in the base and projects through a properly provided hole 174 in element 156. A frame 176 of electrical insulating material such as Bakelite or other molded plastic is provided in the recess 154 and slides smoothly lengthwise therein as shown, a space 178 being left for that purpose. A pair of compression springs 180 urge frame 176 in an upward direction as drawn. A recess 182 is provided, as shown, in the one end of the frame 176, and a push-knob 184 is provided at the top of the frame, extending through a suitably provided hole or slot 186 in the upper end of the skirt.

Operation of the device is as follows:

When the snap-acting element 156 is heated to its snapping point, this separates the contacts and moves the end 188 of element 156 to the right (as drawn, see Fig. 23) far enough to clear the top of the recess 182. This permits the springs 180 to move the frame 176 upwardly, thus bringing the recess 182 under the end 188. When, now, the snap-acting element cools to its snap-back temperature, contact 164 can snap back to meet contact 168, but contacts 162 and 166 are held apart by the top of recess 182. In order to reset these contacts, it is necessary to push downwardly (as drawn) on the knob 184 to slide the frame out from underneath end 188.

Throughout the several embodiments of this invention, one of the important features to be noticed is that the various mechanical stops or steps which maintain certain contacts in the open position, do so by engaging the overhanging end of the thermostat element, and not the face of a contact. That is, at no time is there any foreign organic insulating material placed between cooperating contacts of the device. This means that the contact faces do not come into engagement with any such material, and this is particularly important when it is realized that in the normal action of electric switches, the contact surfaces quite often become rough due to the melting effect of the electric arc. If any material such as those specified (such as Bakelite or other molded plastic), should come between opposing contact faces, and then have to be slid out from between those faces, the roughened faces will scape off some of the softer insulating material, and the scrapings will then prevent proper closure of the electrical contacts. It has hitherto been tried, several times, to use the principle of keeping contacts mechanically apart until a resetting operation is performed, but almost invariably, this has been done by letting the separating material come between the contacts proper, with the above-mentioned serious fault. With the present invention, this cannot occur, and the device always operates satisfactorily.

The present construction has another important advantage. It will be noted that the various mechanical stops or steps are of such height as to separate the indicated contacts effectively from an electrical viewpoint, but that the amount of separation is kept relatively small. This is done deliberately, the purpose being to minimize the contact-bounce which is normally encountered when snap-acting devices of the kinds mentioned herein are used to actuate electrical contacts. In the ordinary use of such snap-acting devices, the contacts are maintained (while the snap-acting device is in its hot position) a relatively great distance away from the stationary contacts. These snap-acting devices act with comparatively great speed in their snap motion and the result of this speed of closing and the contact separation, is that the movable contacts strike the stationary contacts with considerable force, considering the size of the snap-acting element itself. The result of this force is to impart a rebound, or bounce, to the movable contacts. This bounce has a bad effect on the contacts, because during the bounce an arc is drawn which may melt a superficial layer of contact material. The contacts immediately close again (the momentum of the contact having been dissipated) with the material still in the molten state. Immediately upon closing, the arc ceases to flow and the previously molten superficial layers freeze together. If, on the other hand, this contact bounce can be minimized, or even eliminated, then some of this freezing difficulty is also eliminated. By having the contacts separated as little as possible just before closing them, the momentum of the contacts on closing is greatly lessened and the aforementioned difficulties are decreased or eliminated. As a matter of fact, with the constructions shown, many of the advantages of this invention will be realized, if the height of the step above the base is such that the snap-acting element has snapped back and thus has released its stored energy, or is just about to snap back. Therefore, it will be found that the stored energy of the high speed snap motion has either already been expended without the respective contacts having been allowed to touch, or a portion of the stored energy of the snap-acting element has already been released. When, in the several cases the respective detents are then manipulated to allow the respective contacts to close, the only energy left to be considered, and to cause a bounce, is the spring force of the snap-acting element itself or the spring force plus some snap energy, which moves the movable contact through only a short distance. Less momentum is thus engendered in the moving contact on closing, and hence bounce is diminished or even eliminated.

In regard to the closing motion of snap-acting thermostat elements of the kind proposed for use herein, it is one of their characteristics that the motion of the unrestrained element is first a creep motion as the element cools, this creep motion changing suddenly into the high speed snap motion when the temperature is reached at which the element has been designed so to snap. Therefore, considering the element shown in the Fig. 1 embodiment as an example, this element on moving toward the base on the contact-closing part of its cycle, will first creep toward the base and then will reach a distance from the base which is herein called the snap motion distance. When this snap motion distance from the base is reached, the element will enter the snap motion part of its cycle and will suddenly snap towards the base to close the contacts. In all cases shown and described herein, the height of the step which prevents the contacts from closing (because it is interposed between the end or lip of the thermostat element and the base) is such as to be greater than the distance of the end or lip of the thermal element from the base when the contacts are closed, but equal to or less than the above-defined snap distance. The best results are obtained when the distance is such that the element has released its stored energy by the time the step engages the lip. This means, accordingly, that when the thermal element has started its contact-closing motion (that is, the end of the thermal element is moving toward the base), the thermal element will reach its snap temperature and will be about to enter, or will have entered, into the return snap motion part of its motion before it comes to rest on the step with the contacts thus being held apart. It is this characteristic of this construction which is meant above, where it states that the snap-acting element has snapped back to its cold position (or is about to snap) before the several manually-actuated levers or push buttons are actuated to move the step out from underneath the thermal element so that the contacts can close. Because of this, and the fact that the lip slides off the edge of the step when the push button is pushed, contact bounce is greatly lessened.

It is also to be noted that while the embodiments shown herein have the snap-acting thermostat element mounted at its center, the invention also applies to those cases where it is desired to mount the element at one end and have the other end snap. For example, the Fig. 1 embodiment could be changed to mount the disc by the end now carrying contact 16, (as shown in United States Patent No. 2,487,683) thus leaving the end 44 to snap and be controlled positionally by the sliding stop. This same construction could be used in the other embodiments without departing from the spirit of the invention.

In the above description, several of the advantages of the described devices have been pointed out, particularly in connection with the reduction of contact-bounce during closing operation. However, the device has other advantages which will not be pointed out: In the first place, with the described devices, snap-acting thermostat elements of the so-called "automatic" type are used. This is the kind of snap-acting element which has a closing temperature which can be fairly close to the opening temperature. To understand this better, it is necessary to speak of the disadvantages of the "non-automatic" or "manual" thermostat elements which are those elements in which the reclosing temperature must be below the lowest temperature to which the thermostatic switch will be subjected in actual use. In the ordinary case of protective devices where such manual elements are used, this temperature may be of the order of −60° F. The opening temperature of such a device may, however, be of the order of 200° F. Therefore, such thermal devices have a wide temperature differential, and consequently their life may be comparatively short, and they may not hold their set temperatures well. On the contrary, an automatic snap-acting thermostat element has a narrower differential, since the closing or return temperature is generally made not more than 50° lower than the opening temperature. Such devices, therefore, have less stress in them and therefore have a longer life. In addition, an "automatic" type of thermostat element is less costly to make.

Another advantage is that the device shown herein is completely trip-free at the original set temperatures. That is, it is impossible to prevent the contacts being opened by the thermal element, by the actuation of the handle. Thus, regardless of whether the operator is holding onto the manual handle or not in each case, the thermostat element can open its contacts, and thus the electrical circuit governed thereby, when the temperature to which the thermal element has been set, is reached. Some prior devices have not had this trip-free characteristic, the operator being able to maintain the contacts in the closed position, even though the contact-opening temperature of the device has been reached or even exceeded.

Another advantage of the device is that the plunger (that is, the various manually-actuated push buttons and levers) may be used if desired to actuate other devices (such as other contacts, for example), when the plunger is released for motion by the contact-opening motion of the thermostat element in each case.

In view of the above, it will be seen that the several objects of the invention are achieved, and other advantageous results attained.

As many changes could be made in the above constructions and methods without departing from the scope of the invention it is intended that all matter contained in the above description or shown in the accompanying drawings, shall be interpreted as illustrative and not in a limiting sense.

I claim:

1. A thermostat switch comprising a base; a snap-acting thermostat element mounted on the base and adapted to snap toward the base at one temperature and away from the base at another temperature; at least one electrical contact carried by said element and movable thereby toward and away from said base; a lip portion provided on said snap-acting element and extending beyond said contact; a stationary electrical contact positioned on the base so as to be electrically engaged and disengaged by said one contact when said element snaps respectively toward and away from the base; and stop means movably mounted on the base and interposable between said lip portion and the base when said one contact and said stationary contact are separated, to prevent said contacts from closing again, the height of said stop means above the base being greater than the height of said lip above the base when said contacts are closed, but equal to or less than the snap motion distance of said element, said stop means being movable from between said lip portion and said base to permit said contacts to close with an abrupt motion.

2. The thermostatic switch of claim 1 in which both the temperatures at which said snap-acting thermostat element snaps are above that temperature to which the thermostatic switch as a whole is normally subjected.

3. The thermostatic switch of claim 1 in which said stop means moves in a direction transverse to the direction of motion of said lip portion when said snap-acting element snaps to a contact-open position.

4. The thermostatic switch of claim 1 in which said stop means comprises an elongated slide member slidably mounted on said base and adapted to move in a direction transverse to the direction of motion of said lip portion when said snap-acting element snaps to open the contacts, said stop means being provided with a recess therein adapted to receive said lip portion, said recess being provided with a greater and a lesser depth, said lip portion being positioned in the recess of greater depth when said contacts are closed, and being positioned in the recess of lesser depth when said contacts are open.

5. The thermostatic switch of claim 1, in which said stop means comprises an elongated slide member slidably mounted on said base and adapted to move in a direction transverse to the direction of motion of said lip portion when said snap-acting element snaps to open the contacts, said stop means being provided with a recess therein and a step thereon, said recess being adapted to receive said lip portion when said contacts are closed, and said step being adapted to support said lip portion to hold the contacts open.

6. The thermostat switch of claim 1 including means urging said stop means between said lip and base after at least one separation of said contacts.

7. A thermostatic switch comprising a base; a snap-acting thermostat element mounted on the base and adapted to snap toward the base at one temperature and away from the base at another temperature; at least one electrical contact carried by said element and movable thereby toward and away from said base; a lip portion provided on said snap-acting element and extending beyond said contact, a stationary electrical contact positioned on the base so as to be electrically engaged and disengaged by said one contact when said element snaps respectively toward and away from the base; stop means movably mounted on the base and interposable between said lip portion and the base when said one contact and said stationary contact are separated, said stop means comprising an open frame slidably mounted on said base in such position as to have a portion of the periphery thereof move toward and away from said lip portion, said portion of the periphery being higher above the base than the height of said lip portion above the base when the contacts are closed, but equal to or less than the snap distance of said element, said frame surrounding said snap-acting element and said portion thereof being movable from between said lip portion and said base to permit said contacts to close with an abrupt motion; and means urging said portion of the periphery between said lip portion and the base after at least one separation of said contacts.

8. A thermostatic switch comprising a base; a snap-acting thermostat element mounted on the base and adapted to snap toward the base at one temperature and away from the base at another temperature; at least one electrical contact carried by said element and movable thereby toward and away from the base; a stationary electrical contact positioned on the base so as to be electrically engaged and disengaged by said one contact when said element snaps respectively toward and away from the base; a tongue provided on said snap-acting element proximate to said one contact and extending beyond the edge of said snap-acting element, said tongue being moved by said snap-acting element when the latter snaps back and forth; and stop means movably mounted on the base and adapted to be engaged by said tongue, said stop means being provided with a plurality of stop walls which define recesses successively engageable by said tongue and a step engageable by said tongue after the latter has successively engaged said walls, the height of said step above the base being greater than the height of said tongue above the base when said contacts are closed, but equal to or less than the snap motion distance of said element plus the distance of said tongue from said element.

9. The thermostatic switch of Fig. 8 in which said stop means comprises an elongated slide member slidably mounted on said base and movable in a direction transverse to the direction of motion of said tongue, the elongated member being provided with a plurality of upper and lower stop walls with the upper walls being displaced, lengthwise of the slide member, in relation to the lower walls, the lower ends of the upper walls being separated from the upper ends of the lower walls so as to provide a space through which said tongue can move in a downwardly direction, said stop member being provided also with a step following said plurality of stop walls, the height of said step above the base being greater than the height of said tongue above the base when said contacts are closed, but equal to or less than the snap motion distance of said element plus the distance of said tongue above said element, the sides of said upper stop walls being engaged by said tongue at times when said contacts are open, and the sides of said lower stop walls being engaged by said tongue when said contacts are closed.

10. The thermostatic switch of claim 8 in which said stop means comprises an elongated slide member slidably mounted on said base and movable in a direction transverse to the motion of said tongue, said member being provided with a series of upper stop walls defining a series of upper recesses, and a series of lower stop walls defining a series of lower recesses, the walls of the upper series being displaced lengthwise of said slide member in relation to the lower walls, the lower ends of the upper walls being separated from the upper ends of the lower walls to provide a space between each pair of upper and lower walls through which said tongue may move in an upwardly and downwardly direction, the upper corners of said lower walls and the lower corners of said upper walls being inclined at an angle to the direction of motion of said tongue, thereby to provide inclined planes adapted to guide said tongue in and out of said upper and lower recesses when said stop means is moved in one direction transverse to the motion of said tongue, said slide member being provided with a step following said series of upper and lower walls, the height of said step above the base being greater than the height of said tongue above the base when said contacts are closed, but equal to or less than the snap motion distance of said element plus the distance of said tongue from said element, and means urging said slide member along said base.

11. The thermostat switch of claim 8 in which said stop means comprises an elongated arcuate member slidably mounted on said base about a predetermined center thereon, the elongated member being provided with a plurality of upper and lower stop walls, with the lower walls being displaced, lengthwise of the slide member, in relation to the upper walls, the lower ends of the upper walls being separated from the upper ends of the lower walls so as to provide a space through which said tongue can move in a downwardly direction, said stop member being provided also with a step following said plurality of stop walls, the height of said step above the base when said contacts are closed, but equal to or less than the snap motion distance of said element plus the distance of said tongue above said element, the sides of said upper stop walls being engaged by said tongue at times when said contacts are open, and the sides of said lower stop walls being engaged by said tongue when said contacts are closed.

12. The thermostat switch of claim 8 in which said stop means comprises an elongated arcuate member slidably mounted on said base about a predetermined center thereon, said member being provided with a series of upper stop walls defining a series of upper recesses, and a series of lower stop walls defining a series of lower recesses, said upper walls being displaced, lengthwise of said slide member, in relation to said lower walls, the lower ends of the upper walls being separated from the upper ends of the lower walls to provide a space between each pair of upper and lower walls through which said tongue may move in an upwardly and downwardly direction, the upper corners of said lower walls and the lower corners of said upper walls being inclined at an angle to the direction of motion of said tongue, thereby to provide inclined planes adapted to guide said tongue in and out of said upper and lower recesses when said stop means is moved in one direction transverse to the motion of said tongue, said slide member being provided with a step following said series of upper and lower walls, the height of said step above the base being greater than the height of said tongue above the base when said contacts are closed, but equal to or less than the snap motion distance of said element plus the distance of said tongue from said element.

References Cited in the file of this patent

UNITED STATES PATENTS

| | | |
|---|---|---|
| 2,262,397 | Immel et al. | Nov. 11, 1941 |
| 2,374,022 | Lee | Apr. 17, 1945 |
| 2,520,873 | Bean | Aug. 29, 1950 |
| 2,520,874 | Bean | Aug. 29, 1950 |